(12) United States Patent
Ishikawa et al.

(10) Patent No.: US 7,242,159 B2
(45) Date of Patent: Jul. 10, 2007

(54) CONTROLLER FOR DRIVE SYSTEM

(75) Inventors: Tetsuhiro Ishikawa, Nishikamo-gun (JP); Hiroshi Yoshida, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/401,302

(22) Filed: Apr. 11, 2006

(65) Prior Publication Data
US 2006/0250929 A1    Nov. 9, 2006

(30) Foreign Application Priority Data
May 6, 2005    (JP)    ............... 2005-135248

(51) Int. Cl.
 *H02P 1/00*    (2006.01)
 *H02P 3/00*    (2006.01)
 *H02P 5/00*    (2006.01)
(52) U.S. Cl. ................. 318/139; 318/87; 318/140; 318/376

(58) Field of Classification Search ............ None
See application file for complete search history.

(56) References Cited

FOREIGN PATENT DOCUMENTS

| JP | A 8-296537 | 11/1996 |
|----|------------|---------|
| JP | A 2000-278807 | 10/2000 |
| JP | A 2002-335605 | 11/2002 |

*Primary Examiner*—Lincoln Donovan
*Assistant Examiner*—Erick Glass
(74) *Attorney, Agent, or Firm*—Oliff & Berridge, PLC

(57) ABSTRACT

An ECU executes a program including the steps of calculating a capacitor charging electric power value W (1) (a value of electric power to be stored in a capacitor) based on a voltage value of the capacitor, if a vehicle is under braking, calculating a regenerative electric power value W (2) (a value of electric power to be generated by an MG (2) under regenerative braking), if the capacitor charging electric power value W (1) is larger than the regenerative electric power value W (2), driving an engine, generating electric power by MG (1) by driving force of the engine, and charging the capacitor with the electric power generated by the MG (1) and the MG (2).

6 Claims, 5 Drawing Sheets

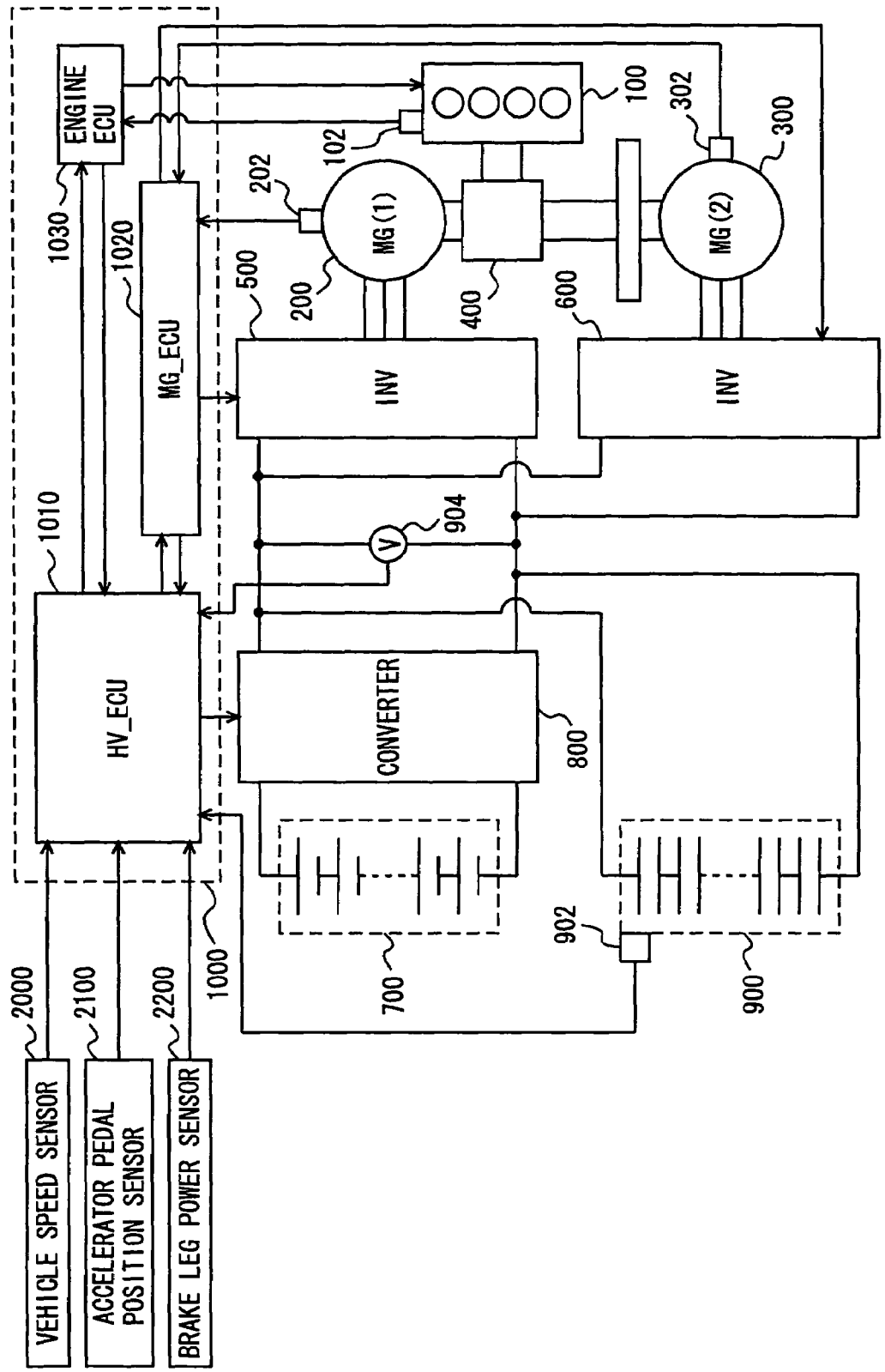
F I G. 1

F I G. 3
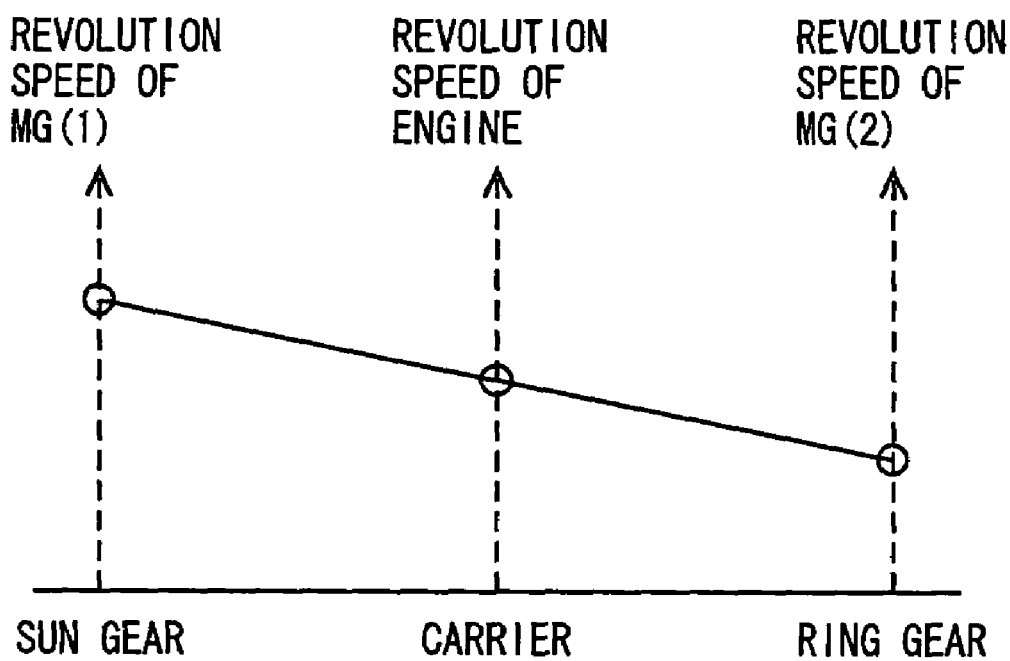

CONTROLLER FOR DRIVE SYSTEM

This nonprovisional application is based on Japanese Patent Application No. 2005-135248 filed with the Japan Patent Office on May 6, 2005, the entire contents of which are hereby incorporated by reference.

BACKGROUND OF THE INVENTION

1. Field of the Invention

The present invention relates to a controller for a drive system, and in particular to a technique of storing electric power generated under regenerative braking of a vehicle.

2. Description of the Background Art

In recent years, as part of measures to address environmental problems, a hybrid vehicle that runs by driving force obtained from at least one of an engine and a motor has received attention. A battery, a capacitor (condenser), and the like are mounted on such a hybrid vehicle for storing electric power to be supplied to the motor.

Japanese Patent Laying-Open No. 08-296537 discloses a retarder device that charges a capacitor and a battery with electric power regenerated under braking. The retarder device described in Japanese Patent Laying-Open No. 08-296537 includes a motor/generator connected to a mechanically-driven system, and a battery connected to the motor/generator, and allows the motor/generator to serve as a power generator under braking to regenerate electric power. A capacitor is further connected to the motor/generator for storing the regenerated electric power. The retarder device includes a charge control portion that supplies the regenerated electric power to the battery for charging the same such that the voltage between terminals of the battery reaches or exceeds the gassing voltage under braking. The charge control portion charges the battery when the voltage between terminals of the capacitor reaches or exceeds predetermined allowable voltage.

According to the retarder device described in the document, electric power regenerated under braking is utilized to provide a refresh charge such that the voltage between the terminals of the battery reaches or exceeds the gassing voltage. It is thereby possible to prolong the life of the battery without supplying charging power from the outside of the vehicle. Furthermore, the regenerated electric power is also supplied to the capacitor under braking, and when the voltage between the terminals of the capacitor reaches or exceeds a permissible value, surplus power is supplied to the battery for a refresh charge. It is thereby possible to utilize the surplus regenerated electric power to perform a refresh charge of the battery.

As to the retarder device described in Japanese Patent Laying-Open No. 08-296537, electric power stored in the capacitor and the battery is used to allow the motor/generator to serve as an electric motor to provide torque assist at the time of engine start and acceleration. However, under regenerative braking, it is not always possible to obtain voltage that reaches or exceeds a permissible value between the terminals of the capacitor. In other words, it is not always possible to obtain regenerative electric power with which the capacitor is fully charged. In such a case, it may not be possible to store sufficient electric power required to accelerate a vehicle as demanded by a driver under reacceleration after regenerative braking.

SUMMARY OF THE INVENTION

An object of the present invention is to provide a controller for a drive system, the controller allowing sufficient electric power required to accelerate a vehicle to be stored under braking.

A controller for a drive system according to the present invention controls the drive system having an engine, a first rotating electric machine generating electric power by driving force from the engine, a second rotating electric machine generating electric power under regenerative braking of a vehicle, and a power storage mechanism, the drive system allowing the vehicle to run by driving force of at least one of the first rotating electric machine and the second rotating electric machine both provided with electric power from the power storage mechanism. The controller includes: a first calculation portion calculating a value of electric power to be stored in the power storage mechanism; a second calculation portion calculating a value of electric power to be generated by the second rotating electric machine; and a control portion controlling the drive system such that, when the value of electric power to be stored in the power storage mechanism is larger than the value of electric power to be generated by the second rotating electric machine under regenerative braking of the vehicle, the engine is driven to allow the first rotating electric machine to generate electric power to be stored in the power storage mechanism.

According to the present invention, if the value of electric power to be stored in the power storage mechanism is larger than the value of electric power to be generated by the second rotating electric machine under regenerative braking of the vehicle, the engine is driven to allow the first rotating electric machine to generate electric power to be stored in the power storage mechanism. Accordingly, if the power storage mechanism cannot be fully charged, under regenerative braking, with electric power (regenerative electric power) generated by the second rotating electric machine, the power storage mechanism can further be charged with the electric power generated by the first rotating electric machine. It is therefore possible to supply sufficient electric power from the power storage mechanism to at least one of the first rotating electric machine and the second rotating electric machine under reacceleration after braking to generate driving force for accelerating the vehicle. As a result, it is possible to provide a controller for a drive system, the controller allowing sufficient electric power required to accelerate the vehicle to be stored under braking.

Preferably, the power storage mechanism includes a capacitor. The first calculation portion calculates a value of electric power to be stored in the capacitor. The control portion controls the drive system such that, when the value of electric power to be stored in the capacitor is larger than the value of electric power to be generated by the second rotating electric machine under regenerative braking of the vehicle, the engine is driven to allow the first rotating electric machine to generate the electric power to be stored in the capacitor.

According to the present invention, when the value of electric power to be stored in the capacitor is larger than the value of electric power to be generated by the second rotating electric machine under regenerative braking of the vehicle, the engine is driven to allow the first rotating electric machine to generate the electric power to be stored in the capacitor. Accordingly, if the capacitor cannot be fully charged, under regenerative braking, with electric power (regenerative electric power) generated by the second rotating electric machine, the capacitor can further be charged with the electric power generated by the first rotating electric machine. It is therefore possible to supply sufficient electric power from the capacitor to at least one of the first rotating electric machine and the second rotating electric machine under reacceleration after braking to generate driving force for accelerating the vehicle.

Preferably, the power storage mechanism includes a battery in addition to the capacitor. The controller further includes a charge control portion controlling the drive system such that, when the value of electric power to be stored in the capacitor is smaller than the value of electric power to be generated by the second rotating electric machine under regenerative braking of the vehicle, electric power generated by the second rotating electric machine is stored in the capacitor and the battery.

According to the present invention, when the value of electric power to be stored in the capacitor is smaller than the value of electric power to be generated by the second rotating electric machine under regenerative braking of the vehicle, electric power generated by the second rotating electric machine is stored in the capacitor and the battery. It is therefore possible to store surplus power, which cannot be stored in the capacitor alone, in the battery.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic configuration diagram showing a hybrid vehicle on which a controller according to an embodiment of the present invention is mounted.

FIG. 3 is an alignment chart showing the relation of revolution speeds of an engine, an MG (1), and an MG (2).

DESCRIPTION OF THE PREFERRED EMBODIMENTS

Figure 2:
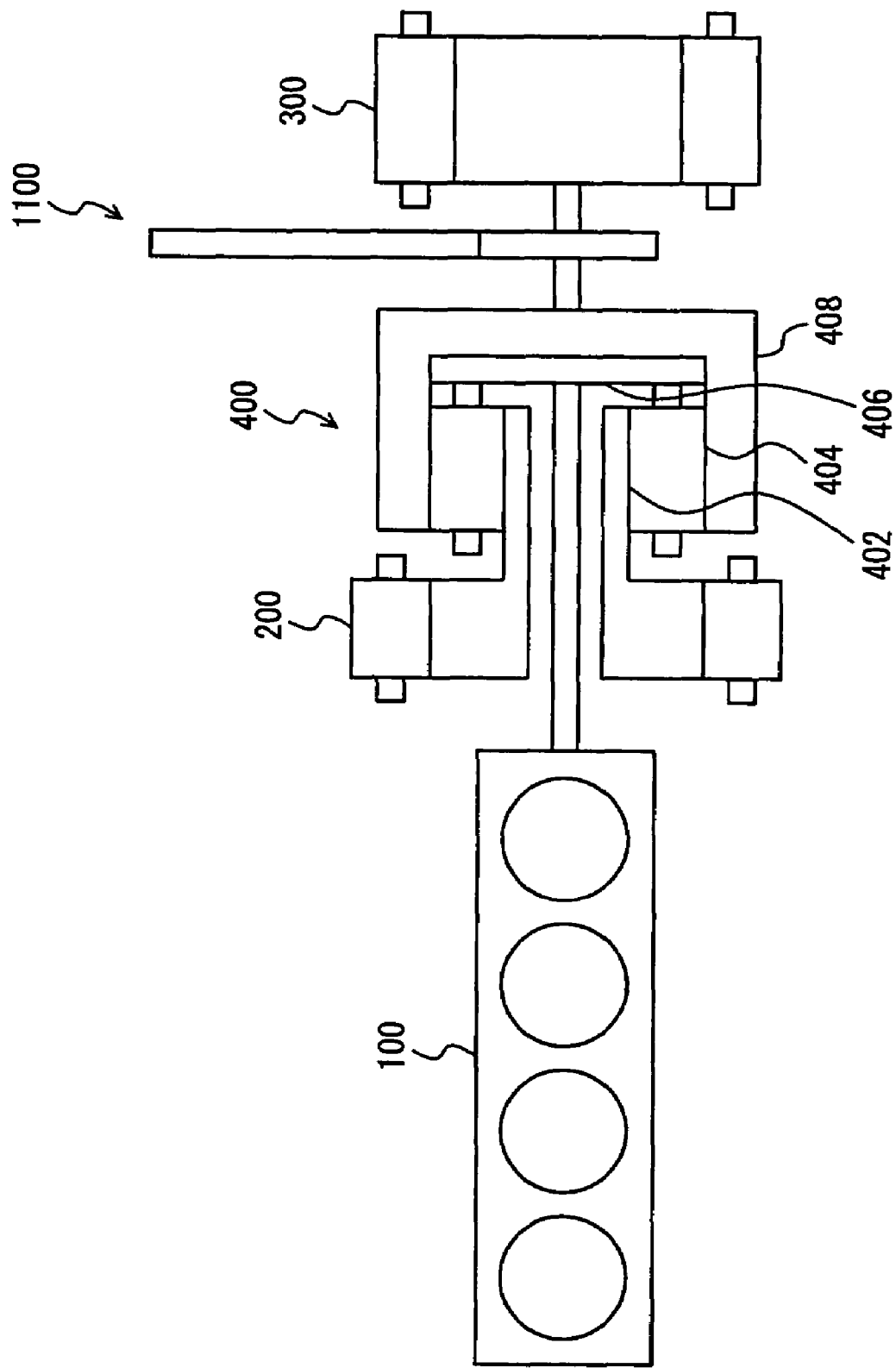
FIG. 2 is a diagram showing a power split device.

The embodiment of the present invention will hereinafter be described in detail with reference to the drawings. In the following description, the same parts are denoted by the same reference characters, and have the same names and functions. Therefore the detailed description thereof will not be repeated.

Referring to FIG. 1, there will be described a hybrid vehicle having a controller according to the present embodiment mounted thereon. The vehicle includes an engine 100, a Motor Generator (MG) (1) 200, an MG (2) 300, a power split device 400, an inverter (1) 500, an inverter (2) 600, a battery 700, a converter 800, and a capacitor 900. The vehicle runs by driving force obtained from at least one of engine 100 and MG (2) 300.

Engine 100, MG (1) 200, and MG (2) 300 are connected via power split device 400. Motive power generated by engine 100 is divided by power split device 400 into two paths. One of the paths is a path for driving wheels (not shown) through a reduction gear, while the other is a path for driving MG (1) 200 to generate electric power.

MG (1) 200 is a three-phase alternating motor. MG (1) 200 generates electric power by the motive power generated by engine 100 and divided by power split device 400. The electric power generated by MG (1) 200 is used in various manners depending on a running state of the vehicle and a State Of Charge (SOC) of battery 700. For example, during normal running, the electric power generated by MG (1) 200 is simply used as electric power for driving MG (2) 300. In contrast, if the SOC of battery 700 is below a predetermined value, the electric power generated by MG (1) 200 is converted by inverter 500 from alternating current to direct current, and then stored in battery 700 with its voltage regulated by converter 800, or is stored in capacitor 900 with its voltage unregulated.

When MG (1) 200 acts as a power generator, MG (1) 200 produces negative torque. The negative torque represents torque that serves as a load of engine 100. In contrast, when MG (1) 200 receives electric power to act as a motor, MG (1) 200 produces positive torque. The positive torque represents torque that does not serve as a load of engine 100, namely, torque that assists engine 100 to rotate. The same applies to MG (2) 300.

MG (2) 300 is a three-phase alternating motor. MG (2) 300 is driven by at least any of the electric power stored in battery 700, the electric power stored in capacitor 900, and the electric power generated by MG (1) 200. Electric power converted by inverter (2) 600 from direct current to alternating current is supplied to MG (2) 300.

Driving force of MG (2) 300 is transmitted to the wheels through the reduction gear. MG (2) 300 thereby assists engine 100, and allows the vehicle to run by its driving force.

In contrast, when the hybrid vehicle is under regenerative braking, MG (2) 300 is driven by the wheels through the reduction gear so that MG (2) 300 acts as a power generator. MG (2) 300 thereby acts as a regenerative brake that converts braking energy into electric power. The electric power generated by MG (2) 300 is stored in battery 700 and capacitor 900 through inverter (2) 600.

Battery 700 is a battery pack formed by integrating a plurality of battery cells into a battery module, and connecting a plurality of the battery modules in series. Voltage to be discharged from battery 700 and voltage to be stored in battery 700 is regulated by converter 800. Capacitor 900 is formed of a plurality of cells connected in parallel. Alternatively, capacitor 900 may be formed such that the cells are partly connected in series to improve withstand voltage characteristic.

Engine 100, inverter (1) 500, inverter (2) 600, and converter 800 are controlled by an Electronic Control Unit (ECU) 1000. ECU 1000 includes a Hybrid Vehicle (HV)_ECU 1010, an MG_ECU 1020, and an engine ECU 1030.

A signal indicative of the temperature of capacitor 900 is input from a temperature sensor 902, and a signal indicative of the voltage of capacitor 900 is input from a voltmeter 904, to HV_ECU 1010. Furthermore, a signal indicative of the vehicle speed is input from a vehicle speed sensor 2000, and a signal indicative of the position of an accelerator pedal (not shown) is input from an accelerator pedal position sensor 2100, and a signal indicative of the leg power on a brake pedal (not shown) is input from a brake pedal leg power sensor 2200, to HV_ECU 1010.

A signal indicative of the revolution speed of MG (1) 200 is input from a revolution speed sensor 202, and a signal indicative of the revolution speed of MG (2) 300 is input from a revolution speed sensor 302, to MG_ECU 1020. A signal indicative of the revolution speed of engine 100 is input from a revolution speed sensor 102 to engine ECU 1030.

HV_ECU 1010, MG_ECU 1020, and engine ECU 1030 are connected such that they can send and receive signals to and from each other. HV_ECU 1010 calculates, for example, output values requested for engine 100, MG (1) 200, and MG (2) 300 based on a signal input to each of the ECUs and a program and map stored in a memory (not shown).

MG_ECU 1020 controls inverter (1) 500 and inverter (2) 600 based on the output values requested for MG (1) 200 and MG (2) 300, and thereby controls MG (1) 200 and MG (2) 300. Engine ECU 1030 controls engine 100 based on the output value requested for engine 100.

Referring to FIG. 2, power split device 400 will further be described. Power split device 400 is formed of a planetary gear including a sun gear 402, a pinion gear 404, a carrier 406, and a ring gear 408.

Pinion gear 404 engages with sun gear 402 and ring gear 408. Carrier 406 rotatably supports pinion gear 404. Sun gear 402 is coupled to a rotary shaft of MG (1) 200. Carrier 406 is coupled to a crankshaft of engine 100. Ring gear 408 is coupled to a rotary shaft of MG (2) 300 and to reduction gear 1100.

Since engine 100, MG (1) 200, and MG (2) 300 are coupled through power split device 400 formed of the planetary gear, the revolution speeds of engine 100, MG (1) 200, and MG (2) 300 have a relation in which the revolution speeds are linearly connected with each other in an alignment chart as shown in FIG. 3.

Figure 4:
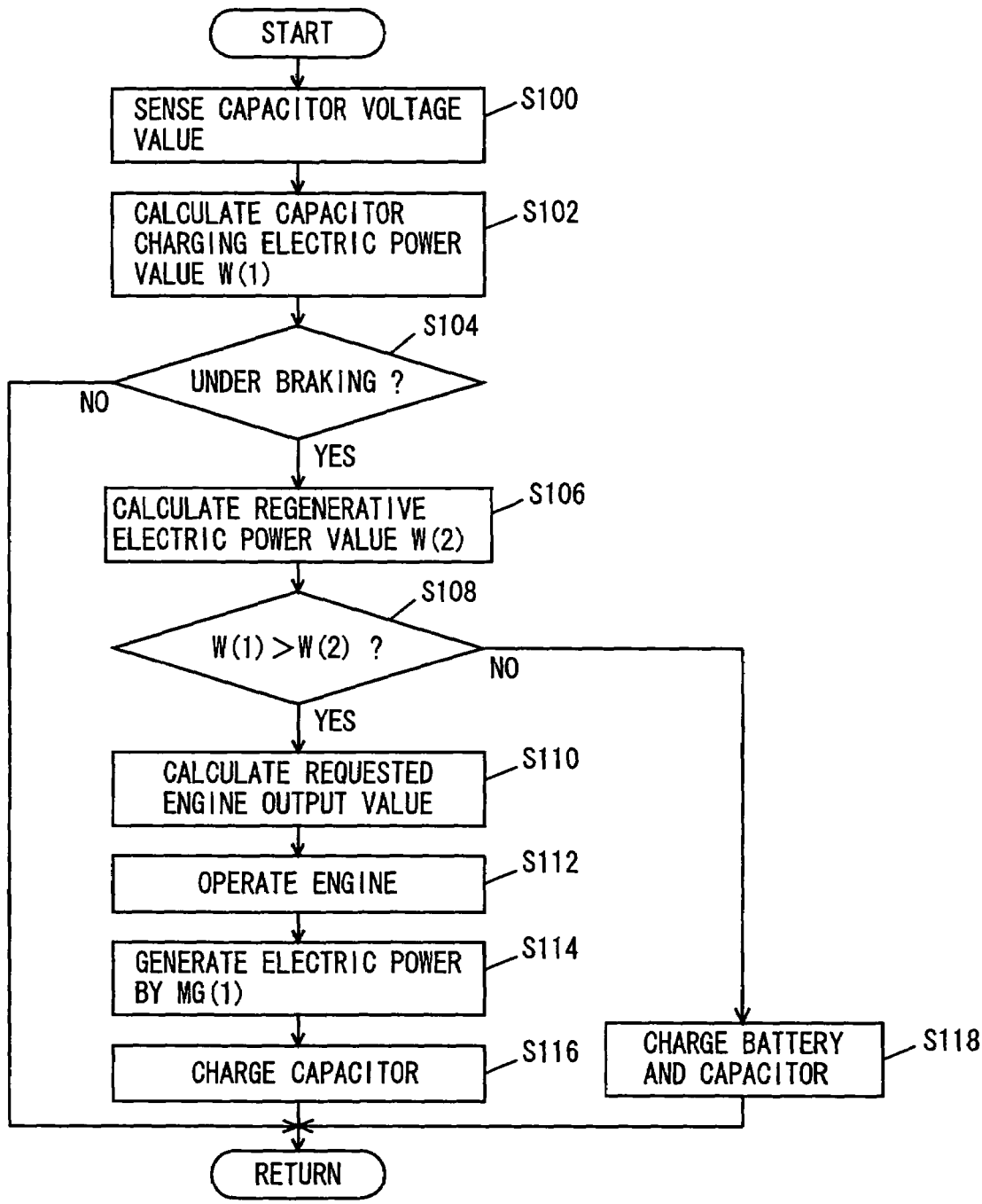
FIG. 4 is a flowchart showing a control structure of a program executed on an ECU serving as the controller according to the embodiment of the present invention.

Referring to FIG. 4, there will be described a control structure of a program executed by ECU 1000, which serves as the controller according to the present embodiment.

In step (hereinafter referred to as S) 100, ECU 1000 senses a voltage value of capacitor 900 (a system voltage value) based on a signal transmitted from voltmeter 904.

In S102, based on the sensed voltage value of the capacitor 900, ECU 1000 calculates a capacitor charging electric power value W (1) (a value of electric power to be stored in capacitor 900). The higher voltage value capacitor 900 has, the lower capacitor charging electric power value W (1) is calculated.

In S104, ECU 1000 determines whether or not the vehicle is under braking. If a brake pedal is pressed, ECU 1000 determines that the vehicle is under braking. If the vehicle is under braking (YES in S104), the process proceeds to S106. If not so (NO in S104), the process terminates.

In S106, ECU 1000 calculates a regenerative electric power value W (2) (a value of electric power to be generated by MG (2) 300 under regenerative braking). Regenerative electric power value W (2) is calculated based on a map that uses a vehicle speed, an accelerator pedal position, a leg power on a brake pedal, for example, as parameters.

In S108, ECU 1000 determines whether or not capacitor charging electric power value W (1) is larger than regenerative electric power value W (2). If capacitor charging electric power value W (1) is larger than regenerative electric power value W (2) (YES in S108), the process proceeds to S110. If not so (NO in S108), the process proceeds to S118.

In S110, ECU 1000 calculates a requested engine output value (a value of a target output of engine 100). The requested engine output value is calculated, for example, as a value obtained by subtracting regenerative electric power value W (2) from capacitor charging electric power value W (1).

In S112, ECU 1000 drives engine 100 such that the calculated requested engine output value is obtained. If engine 100 stops at that time, it is started. In S114, ECU 1000 allows MG (1) 200 to generate electric power.

In S116, ECU 1000 allows capacitor 900 to be charged with the electric power generated by MG (1) 200 and MG (2) 300. At that time, by setting a voltage value commanded by ECU 1000 to converter 800 to be larger than the voltage value of capacitor 900 by a predetermined value, the electric power generated by MG (1) 200 and MG (2) 300 is stored in capacitor 900. Thereafter the process terminates. In S118, ECU 1000 allows battery 700 and capacitor 900 to be charged with the electric power generated by MG (2) 300. Thereafter the process terminates.

There will be described an operation of ECU 1000, which serves as the controller according to the present embodiment, the operation being based on the above-described structure and the flowchart.

While the vehicle is running, a voltage value of capacitor 900 is sensed based on a signal transmitted from voltmeter 904 (S100). Based on the sensed voltage value of capacitor 900, capacitor charging electric power value W (1) is calculated (S102).

When the vehicle is under braking (YES in S104), the vehicle may be reaccelerated subsequently. At this time, capacitor 900 is superior to battery 700 in instantaneous output characteristic. It is thus desirable for capacitor 900 to be discharged preferentially under acceleration of the vehicle to drive MG (2) 300. Therefore capacitor 900 is required to be fully charged under braking of the vehicle.

In order to determine whether or not capacitor 900 can be fully charged under braking of the vehicle, regenerative electric power value W (2) is calculated (S106), and it is determined whether or not capacitor charging electric power value W (1) is larger than regenerative electric power value W (2) (S108).

Figure 5:
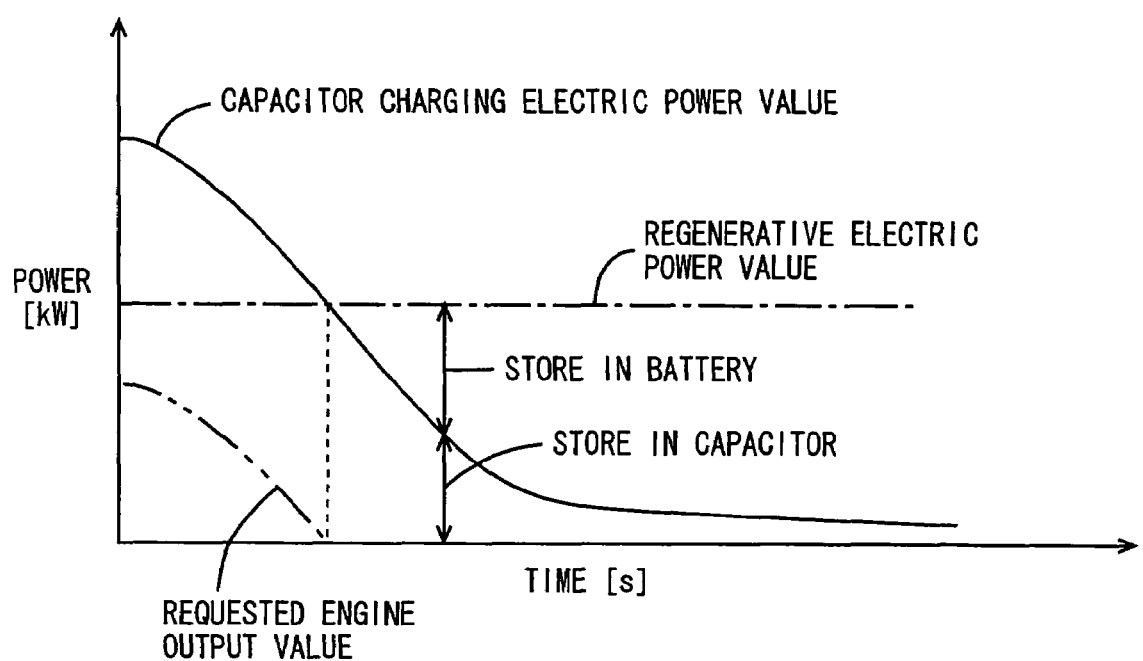
FIG. 5 shows a timing diagram showing a transition of a capacitor charging electric power value, a regenerative electric power value, and a requested engine output value.

As shown in FIG. 5, if capacitor charging electric power value W (1) is larger than regenerative electric power value W (2) (YES in S108), capacitor 900 cannot be fully charged by regenerative electric power alone. In this case, a requested engine output value is calculated (S110), and engine 100 is driven such that the calculated requested engine output value is obtained (S112). With driving force obtained from engine 100, MG (1) 200 generates electric power (S114), and capacitor 900 is charged with the electric power generated by MG (1) 200 and MG (2) 300 (S116).

Accordingly, it is possible to store sufficient electric power required for acceleration of the vehicle after braking, and hence sufficient electric power can be supplied from capacitor 900 to MG (2) 300 to accelerate the vehicle in a responsive manner. Furthermore, by causing engine 100 to be driven for charging capacitor 900 only under braking, it is possible to prevent the operating period of engine 100 from being unnecessarily prolonged, and to prevent deterioration in fuel consumption.

In contrast, if capacitor charging electric power value W (1) is smaller than regenerative electric power value W (2) (NO in S108), capacitor 900 can be fully charged by regenerative electric power value W (2) alone. In this case, all the regenerated electric power cannot be stored in capacitor 900 alone. Accordingly, engine 100 is not driven, and electric power regenerated by MG (2) 300 is stored in battery 700 and capacitor 900. It is thereby possible to recapture much more regenerated energy.

As described above, the ECU, which serves as the controller according to the present embodiment, drives the engine to allow MG (1) to generate electric power if capacitor charging electric power value W (1) is larger than regenerative electric power value W (2) under regenerative braking. The capacitor is charged with the electric power generated by MG (1) and MG (2). It is thereby possible to store in the capacitor sufficient electric power required for acceleration after braking.

In the present embodiment, if capacitor charging electric power value W (1) is larger than regenerative electric power value W (2), engine 100 is driven to allow MG (1) 200 to generate electric power. However, engine 100 may be driven to allow MG (1) 200 to generate electric power if a value of capacitor charging electric power value W (1) plus battery charging electric power (electric power to be stored in the battery) is larger than regenerative electric power value W (2). In this case, the requested engine output value may be calculated by subtracting regenerative electric power value W (2) from the value of capacitor charging electric power value W (1) plus battery charging electric power (electric power to be stored in the battery).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A controller for a drive system having an engine, a first rotating electric machine generating electric power by driving force from said engine, a second rotating electric machine generating electric power under regenerative braking of a vehicle, and a power storage mechanism, the drive system allowing the vehicle to run by driving force of at least one of said first rotating electric machine and said second rotating electric machine both provided with electric power from said power storage mechanism, the controller for the drive system comprising:

a first calculation portion calculating a value of electric power to be stored in said power storage mechanism;

a second calculation portion calculating a value of electric power to be generated by said second rotating electric machine; and a control portion controlling said drive system such that, when the value of electric power to be stored in said power storage mechanism is larger than the value of electric power to be generated by said second rotating electric machine under regenerative braking of said vehicle, said engine is driven to allow said first rotating electric machine to generate electric power to be stored in said power storage mechanism.

2. The controller for the drive system according to claim 1, wherein said power storage mechanism includes a capacitor, said first calculation portion calculates a value of electric power to be stored in said capacitor, and said control portion controls said drive system such that, when the value of electric power to be stored in said capacitor is larger than the value of electric power to be generated by said second rotating electric machine under regenerative braking of said vehicle, said engine is driven to allow said first rotating electric machine to generate the electric power to be stored in said capacitor.

3. The controller for the drive system according to claim 2, wherein said power storage mechanism includes a battery in addition to said capacitor, and said controller further comprises a charge control portion controlling said drive system such that, when the value of electric power to be stored in said capacitor is smaller than the value of electric power to be generated by said second rotating electric machine under regenerative braking of said vehicle, electric power generated by said second rotating electric machine is stored in said capacitor and said battery.

4. A controller for a drive system having an engine, a first rotating electric machine generating electric power by driving force from said engine, a second rotating electric machine generating electric power under regenerative braking of a vehicle, and a power storage mechanism, the drive system allowing the vehicle to run by driving force of at least one of said first rotating electric machine and said second rotating electric machine both provided with electric power from said power storage mechanism, the controller for the drive system comprising:

first calculation means for calculating a value of electric power to be stored in said power storage mechanism;

second calculation means for calculating a value of electric power to be generated by said second rotating electric machine; and control means for controlling said drive system such that, when the value of electric power to be stored in said power storage mechanism is larger than the value of electric power to be generated by said second rotating electric machine under regenerative braking of said vehicle, said engine is driven to allow said first rotating electric machine to generate electric power to be stored in said power storage mechanism.

5. The controller for the drive system according to claim 4, wherein said power storage mechanism includes a capacitor, said first calculation means includes means for calculating a value of electric power to be stored in said capacitor, and said control means includes means for controlling said drive system such that, when the value of electric power to be stored in said capacitor is larger than the value of electric power to be generated by said second rotating electric machine under regenerative braking of said vehicle, said engine is driven to allow said first rotating electric machine to generate the electric power to be stored in said capacitor.

6. The controller for the drive system according to claim 5, wherein said power storage mechanism includes a battery in addition to said capacitor, and said controller further comprises means for controlling said drive system such that, when the value of electric power to be stored in said capacitor is smaller than the value of electric power to be generated by said second rotating electric machine under regenerative braking of said vehicle, electric power generated by said second rotating electric machine is stored in said capacitor and said battery.

* * * * *